United States Patent
Choi

(10) Patent No.: US 7,589,789 B2
(45) Date of Patent: Sep. 15, 2009

(54) VIDEO CONVERTING DEVICE AND METHOD FOR DIGITAL TV

(75) Inventor: Seung J. Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 514 days.

(21) Appl. No.: 11/144,665

(22) Filed: Jun. 6, 2005

(65) Prior Publication Data

US 2006/0033838 A1   Feb. 16, 2006

Related U.S. Application Data

(63) Continuation-in-part of application No. 09/566,630, filed on May 8, 2000, now abandoned.

(30) Foreign Application Priority Data

May 8, 1999   (KR) .......................... 10-1999-16469
May 8, 1999   (KR) .......................... 10-1999-16470

(51) Int. Cl.
  *H04N 7/01*   (2006.01)
  *H04N 11/20*  (2006.01)
  *H04N 5/44*   (2006.01)
  *H04N 5/46*   (2006.01)
  *H04N 5/50*   (2006.01)

(52) U.S. Cl. ................... 348/441; 348/556; 348/558; 348/570; 348/586; 348/725; 348/731

(58) Field of Classification Search ................ 348/715, 348/716

See application file for complete search history.

(56) References Cited

U.S. PATENT DOCUMENTS

| | | | |
|---|---|---|---|
| 5,452,023 A | 9/1995 | Kim | |
| 5,786,845 A | 7/1998 | Tsuria | |
| 5,796,438 A | 8/1998 | Hosono | |
| 5,995,160 A | 11/1999 | Rumreich | |
| 6,091,459 A | 7/2000 | Masaike | |
| 6,115,080 A | 9/2000 | Reitmeier | |
| 6,118,498 A | 9/2000 | Reitmeier | |
| 6,266,104 B1* | 7/2001 | Kim | .......................... 348/714 |
| 6,317,168 B1 | 11/2001 | Seo | |
| 6,327,000 B1 | 12/2001 | Auld et al. | |
| 6,330,666 B1 | 12/2001 | Wise et al. | |
| 6,359,660 B1* | 3/2002 | Matsuo et al. | .............. 348/716 |
| 6,452,638 B1 | 9/2002 | Oku et al. | |
| 6,483,945 B1 | 11/2002 | Kato | |
| 6,490,001 B1* | 12/2002 | Shintani et al. | ............. 348/554 |
| 6,512,882 B1 | 1/2003 | Teunissen | |
| 6,549,240 B1 | 4/2003 | Reitmeier | |
| 6,549,243 B1 | 4/2003 | Takashimizu et al. | |

(Continued)

FOREIGN PATENT DOCUMENTS

KR   1020000073269 A   12/2000
KR   1020000073270 A   12/2000

*Primary Examiner*—Brian P Yenke
(74) *Attorney, Agent, or Firm*—Birch, Stewart, Kolasch & Birch, LLP

(57) ABSTRACT

A video converting device and method for a digital TV is disclosed. The present invention is capable of detecting whether a conversion is being processed and displaying a previous video or a predetermined pattern for a predetermined time during which the conversion is being processed. If there is no video signal, the present invention displays a predetermined pattern, thereby outputting a pleasant screen to a user. Also, the present invention reduces the conversion time by structuring the bit streams into a GOP.

20 Claims, 7 Drawing Sheets

U.S. PATENT DOCUMENTS

| | | |
|---|---|---|
| 6,580,462 B2 | 6/2003 | Inoue et al. |
| 6,597,405 B1 | 7/2003 | Iggulden |
| 6,609,251 B1 | 8/2003 | Yoneda |
| 6,775,751 B2 * | 8/2004 | Tremaine ................... 711/154 |
| 6,937,291 B1 * | 8/2005 | Gryskiewicz ............... 348/581 |
| 6,947,100 B1 * | 9/2005 | Proebsting ................. 348/714 |
| 6,999,127 B2 * | 2/2006 | Ryoo et al. ................. 348/441 |
| 7,071,999 B2 * | 7/2006 | Lee ............................ 348/714 |
| 7,206,025 B2 * | 4/2007 | Choi .......................... 348/441 |
| 2001/0048803 A1 | 12/2001 | Imahashi et al. |
| 2002/0130970 A1 | 9/2002 | Jiang |
| 2003/0133502 A1 | 7/2003 | Yagasaki et al. |

\* cited by examiner

VIDEO CONVERTING DEVICE AND METHOD FOR DIGITAL TV

This application is a Continuation-In-Part of application Ser. No. 09/566,630, filed on May 8, 2000 now abandoned, the entire contents of which are hereby incorporated by reference and for which priority is claimed under 35 U.S.C. § 120. This application also claims foreign priority benefit of Korean Application Nos. 1999-16469 and 1999-16470 filed respectively on May 8, 1999, the entire contents of which are hereby incorporated by reference.

BACKGROUND OF THE INVENTION

1. Field of the Invention

The present invention relates to a digital TV, and more particularly, to a video converting device and method for a digital TV.

2. Discussion of Related Art

Generally, a digital TV provides an image of a higher quality to a viewer when compared with an analog TV. Therefore, as the interest in digital TVs rise, the technology to compress and transmit video data to a digital TV receiver has been rapidly developing.

FIG. 1 is a block diagram of a typical digital TV. Assuming that the video signal is compressed according to a Moving Pictures Expert Group-2 (MPEG-2) algorithm and transmitted by a Vestigial Side Band (VSB) method, the digital TV includes a tuner 100 which selects one of a plurality of channels received through an antenna and outputs the selected channel to a VSB demodulator 101. The VSB demodulator 101 performs a VSB demodulation of the channel frequency tuned by the tuner 100 and outputs the demodulated channel to a transport inverse multiplexer 102.

In a VSB transmission, two side bands are formed above and below the carrier upon an amplitude modulation of a signal and when one side band is greatly attenuated, only the remaining side band is modulated. For example, a ground wave uses an 8 VSB modulation.

Because the VSB demodulated signal output to the transport inverse demultiplexer 102 is composed of both video and audio signals which are multiplexed in a transport packet type, the transport inverse demultiplexer 102 separates the video and audio signals. The video signal is then output to a video decoder 103 and the audio signal is output to an audio decoder 105.

The video decoder 103 restores the MPEG-2 compressed video signal to its original signal. Namely, the video decoder 103 implements a variable length decoding (VLD) to a pure data, i.e. data of the input video signal excluding overhead such as various header information and start code. Thus, the video coder 103 restores the original pixel values for the screen through an inverse quantization, an inverse discrete cosine transformation, and a movement compensation using movement vectors. The restored pixel values are output to a display processor 104 which converts the decoded video signal to conform with the output format of a display device and displays the video signal through a monitor.

The audio decoder 105 restores the compressed audio signal to its original signal and converts the restored signal into an analog signal, thereby playing the analog signal through a speaker.

However, the digital TV in the related art requires relatively a certain amount of time from the reception to the display of an input signal when there is a change of channel. For example, the digital TV requires a time for converting a signal from the tuner 100 into digital data through the VSB demodulator 101, a time to search for a Packet Identification (PID) corresponding to the audio and video signals in a Program Association Table/Program Map Table (PAT/PMT) or a Program and System Information Protocol (PSIP), a time for the video decoder 103 to begin decoding in conformity with a Decoding Time Stamp (DTS) after storing the bit stream, and a time to decode and display an I (Intra) picture.

Although, a time period of about 2 seconds elapses for the above process, the digital TV still needs a longer time period than an analog TV. Therefore, reducing a time required for changing a channel is important to provide a more convenient viewing to a user.

In addition, a digital TV is capable of transmitting a broadcasting signal in a multi-format. For example, the Advanced Television Systems Committee (ATSC), which sets the standards for the digital TV in the United States, prescribes 18 formats. Thus, a transmission format may change depending upon a program, even for the same channel. Namely, one program may be transmitted in an interlaced format of 1920*1080I while the next program may be transmitted in a 704*480I format.

Furthermore, the format of the input video may differ from the format necessary to display the video. In such case, the video format must be converted to conform to the display format. Thus, if the format of an input video is 720*480I and the display format of the video is 1920*1080I, the 720*480I format must be converted into the 1920*1080I format. If the format conversion is not well processed, a portion of the picture may be momentarily broken and displayed. As a result, accurately converting the format within a short period of time is also important to provide a convenient viewing to a user.

Moreover, the video signal processing Applicable Specific Integrated Circuit (ASIC) for the digital TV uses a memory upon all conversion. Such memory includes three sheets of frame memories which are needed to decode the MPEG-2 video bit stream. The memory is also used to provide an additional display option such as a Picture In Picture (PIP) as shown in FIG. 2.

For example, a memory map for decoding and displaying a high definition (HD) video is shown in FIG. 3A, and FIG. 3B shows a memory map for displaying the HD video on a main screen while displaying externally input video signals on a subscreen such as the PIP. Here, the externally input video signals are all other signals other than a digital signals including the National Television Standards Committee (NTSC) signal or a Video Graphics Array (VGA) signal. Accordingly, the memory map changes depending upon the mode selected by a user. Since the memory maps are changed upon a mode conversion, efficiently processing a mode conversion becomes important.

As discussed above, a conventional digital TV needs a longer tuning time than an analog TV. Also, the picture may be broken upon an input conversion or display format conversion. Finally, the time for a mode conversion is prolonged.

Furthermore, a digital TV should decode and display a digital bit stream, as well as process an external input signal including the NTSC broadcasting signal, the VGA signal and other video signals of a field/frame type. Moreover, when a video signal is not contained in the input signal, the digital TV should execute an appropriate signal processing.

For example, an analog TV displays a video signal, if the video signal is contained in the input signal and displays an arbitrary background color such as the color blue, if the video signal is not contained in the input signal. In other words, if there is no channel signal, i.e. the video signal is not received, or if there is no input signal from the Video Cassette Recorder (VCR), the screen is not directly processed to display a noise, but processed to display a background color, for a more beautiful screen display.

However, a digital TV in the related art simply processes and displays, even a noise, if a video signal is not contained in the input signal. As a result, the digital TV in the related art cannot provide a pleasant viewing experience to a user.

SUMMARY OF THE INVENTION

Accordingly, an object of the present invention is to solve at least the problems and disadvantages of the related art.

An object of the invention is to provide a video converting device and method for a digital TV which is capable of efficiently processing video for various conversions.

Another object of the invention is to provide a video converting device and method for a digital TV which is capable of repeatedly displaying a previous picture or displaying a predetermined pattern during a conversion.

A further object of the invention is to provide a video converting device and method for a digital TV which is capable of displaying a predetermined pattern, when a video signal is not contained in an input signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a video converting device of a digital TV includes a memory for video decoding and display; a video decoder for reading a compressed bit stream from the memory, restoring the read signal to the original state, and storing the restored signal back to the memory; a video and conversion (V&C) information detector for detecting conversion information such as a format, an input, a channel and a mode conversion; a display processor for processing a corresponding conversion, when a conversion is detected in the V&C information detector, and maintaining a previous video for a predetermined time period during which the corresponding conversion is processed; and a video signal processing controller for designating the position within the memory to control the video decoding, the conversion, the video display.

The V&C information detector detects the conversion information from the type, various header and format conversion information of the video bit stream decoded and output from the video decoder. Also, the V&C may detect a conversion information from a selection by a user input through an input device.

Also, the display processor repeatedly displays a previous video, which had been decoded and displayed before a detection of a conversion, during the predetermined time while the conversion is being processed, under the control of the video signal processing controller. Here, the predetermined time represents the time required for a picture to be decoded and displayed, without any breakage.

Moreover, the V&C information detector detects for an existence or non-existence of a video signal from the type and various header information of the video bit stream decoded and output from the video decoder. On the other hand, the V&C information detector may detect a conversion information as well as the existence or non-existence of a video signal from an input synchronizing signal of an analog video. The detected result is then output to the video signal processing controller.

In another embodiment, the video converting device of the digital TV according to the present invention may further include a pattern generator for generating and outputting a predetermined pattern under the control of the video signal processing controller; and a video selector for selecting one of either the output of the display processor or the output of the pattern generator in accordance with a display 'on'/'off' state output from the video signal processing controller, and for outputting the selected result as a final video.

In the second embodiment, the video signal processing controller controls the pattern generator and the video selector. Namely, if a non-existence of video signal is detected by the V&C information detector, the video signal processing controller may display the predetermined pattern during the predetermined time when a conversion is being processed.

A present method for video conversion in a digital TV having a memory for video decoding and display includes reading a compressed bit stream from the memory to restore the read signal to the original state and store the restored result to the memory, and outputting the type, various header information and format conversion information of the decoded video bit stream; inputting analog video and interfacing the input analog video; detecting an existence of a video signal and a conversion information from the type, various header information and the format conversion information of the video bit stream or from an input synchronizing signal of the analog video; implementing a corresponding conversion and maintaining a previous video for a predetermined time during which the conversion is being processed, if the conversion information is detected; and controlling the position of the memory to control the video decoding, the conversion and the video display.

The systems and methods according to the present invention comprise a video converting device/method capable of obtaining a control signal based on a comparison of two successive and dissimilar conversions of a video format and using the obtained control signal in controlling a displayed picture based on the converted video signal, i.e., the output of the video converting device. The control signal is obtained by, for example, a video signal processing controller, and is output to, for example, a display processor, to be applied to the converted video signal output in the event of dissimilar format conversions being detected in succession.

Various exemplary embodiments of the systems and methods of the present invention include a converted video signal output that is in essence "blanked" or "frozen" according to the video signal processing controller's control signal output, which is applied in conjunction with a display on/off signal output to the display processor. Rather than a comparison of contrasting input and output video formats, for which video format conversion is always necessary and is continuous throughout a digital television's display, various exemplary embodiments of the comparison of the present invention are based on first and second instances of video format conversion, the first being a current video format conversion and the second being a next video format conversion, and indicates a need for remapping a memory which stores an encoded bit stream. The occurrence of a pair of successive and dissimilar types of video format conversion necessitates memory remapping before the desired/necessary video format conversion can begin, and memory remapping is necessitated only when there is a change in the type of conversion being performed rather than for the performance of any particular conversion; in other words, one type of conversion corresponds to a given combination of the input and output video formats. Thus, the control signal output from the video signal processing controller to the display processor blanks or freezes the converted video signal only when memory remapping occurs and only for the duration of the memory remapping.

Memory remapping in accordance with various exemplary embodiments of the systems and methods according to the present invention is a type of "format conversion," which is included in a video (or video format) conversion operation, such that format conversion according to the present invention is a video display condition resulting in a detection of "conversion information" by a conversion information detector as part of a video and conversion information detector. This detection corresponds to the above comparison of the present invention and to a need for memory remapping. The various types of systems and methods of conversion according to the present invention, which correlate to conversion information to be detected, include "input conversion," "channel conversion," and "input conversion," and the need for a specific conversion type arises whenever there is a video display condition resulting from the "format conversion" (i.e., memory remapping) due to a specific change in the video format that occurs at the input or a variation in the video format that is desired/necessary at the output. One exemplary embodiment of "input conversion" as described herein occurs due to a variation in the input video format during a program on a given channel, which is usually unknown to the user but which is announced to the system, typically by including specific header information in the video bit stream; an instance of "channel conversion" as described herein occurs due to a variation in the input video format caused by a specific user input, e.g., changing the tuned channel, which may or may not directly effect an instance of input conversion; and an instance of "mode conversion" as described herein occurs due to a variation in the output video format caused by a specific user input, e.g., changing the display mode.

In addition, various exemplary embodiments of the systems and methods of the present invention can apparently reduce the delay in remapping through selection of a particular picture of a group of pictures. If, for example, the closed_GOP flag of a GOP-structured bit stream has a predetermined value (e.g., "1"), the B picture is the first displayed picture upon resumption of a newly processed video format conversion, which effectively reduces the time of controlling the converted video signal output, which corresponds to the remapping time ($T_k$) and is referred to hereinafter as "conversion time" or "converting time."

The various video converting systems and methods of the digital TV according to the present invention may further comprise displaying a predetermined pattern, if the video signal is not detected or if the conversion information is detected.

BRIEF DESCRIPTION OF THE ATTACHED DRAWINGS

The invention will be described in detail with reference to the following drawings in which like reference numerals refer to like elements wherein.

DETAILED DESCRIPTION OF EXEMPLARY EMBODIMENTS

Reference will now be made in detail to various embodiments of the present invention, examples of which are illustrated in the accompanying drawings.

Figure 1:
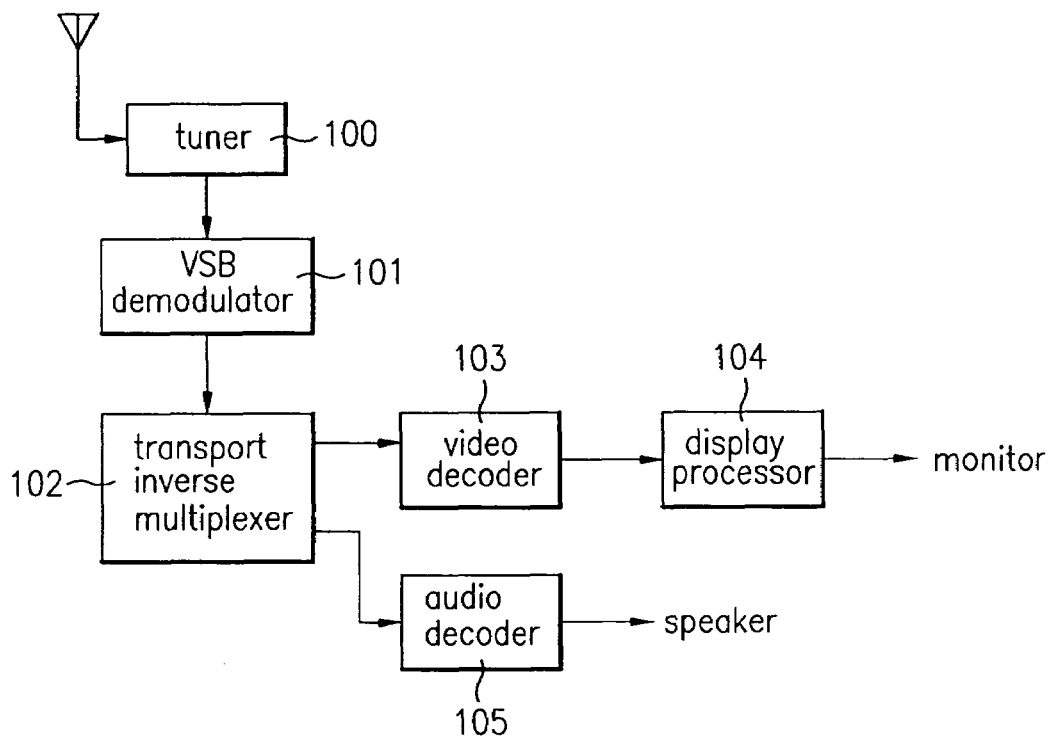
FIG. 1 is a block diagram of a general digital TV in the related art.
Figure 2:
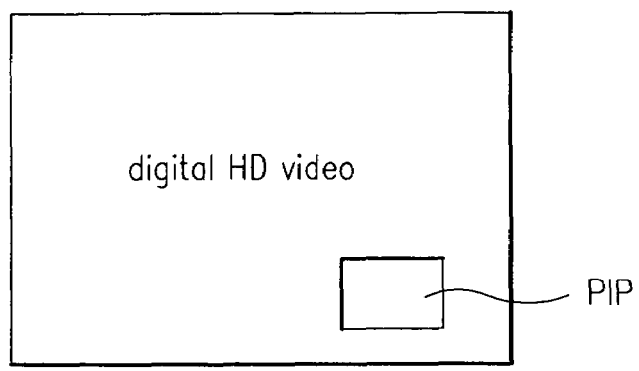
FIG. 2 illustrates a PIP mode of a digital TV.
Figure 3A:
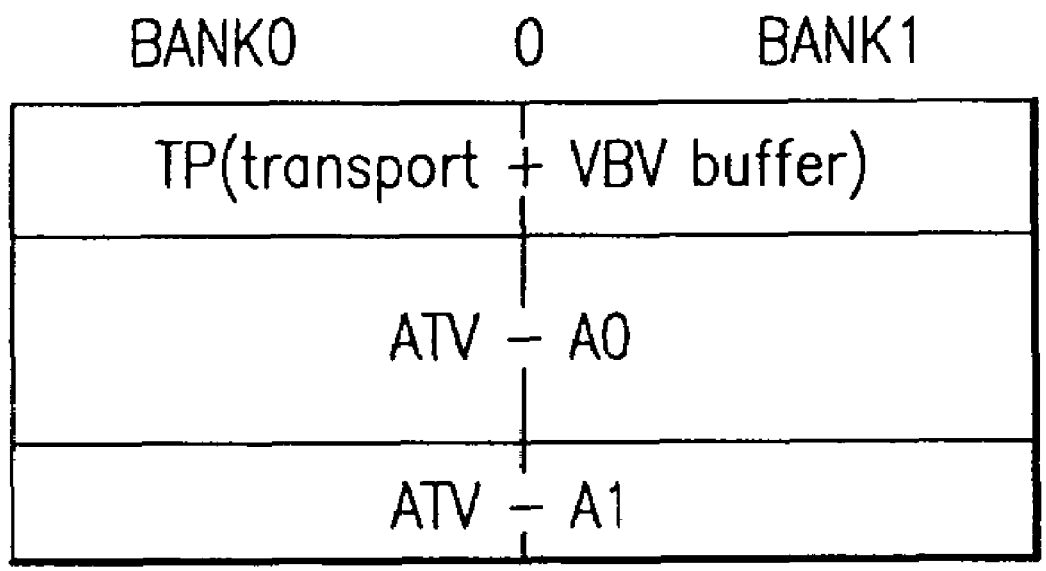
FIGS. 3A and 3B show examples of memory map construction in a digital TV.
Figure 3A:
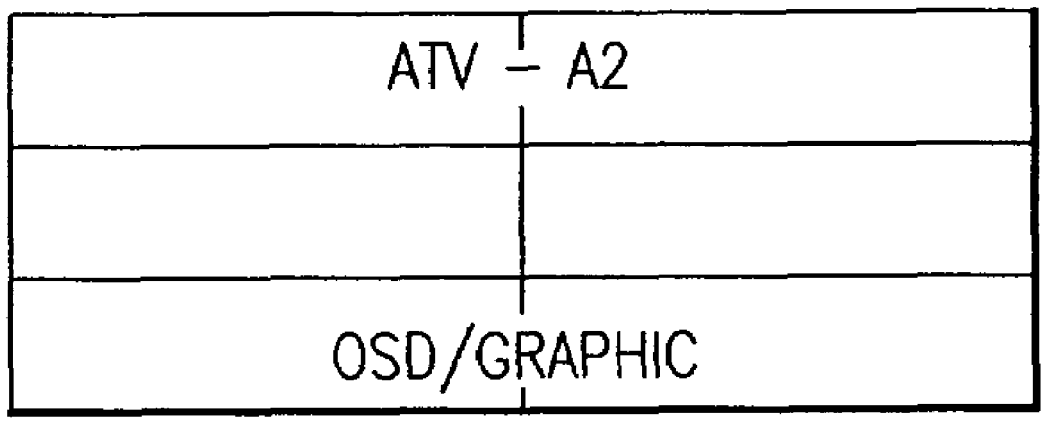
Figure 3B:
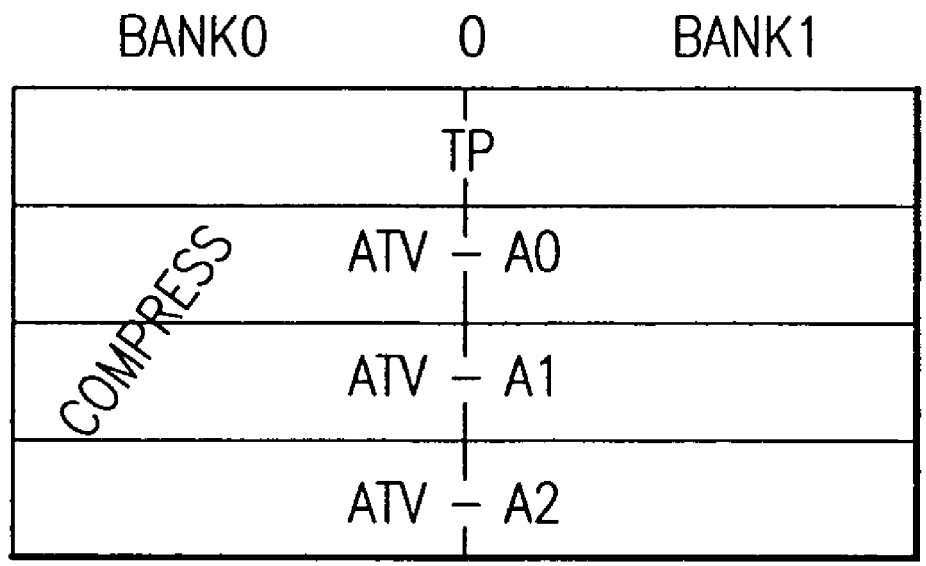
Figure 3B:
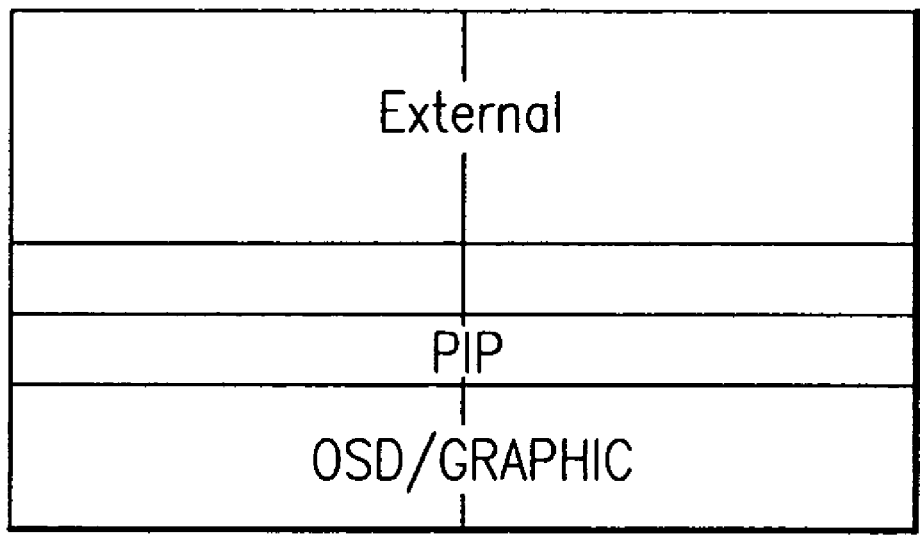
Figure 4:
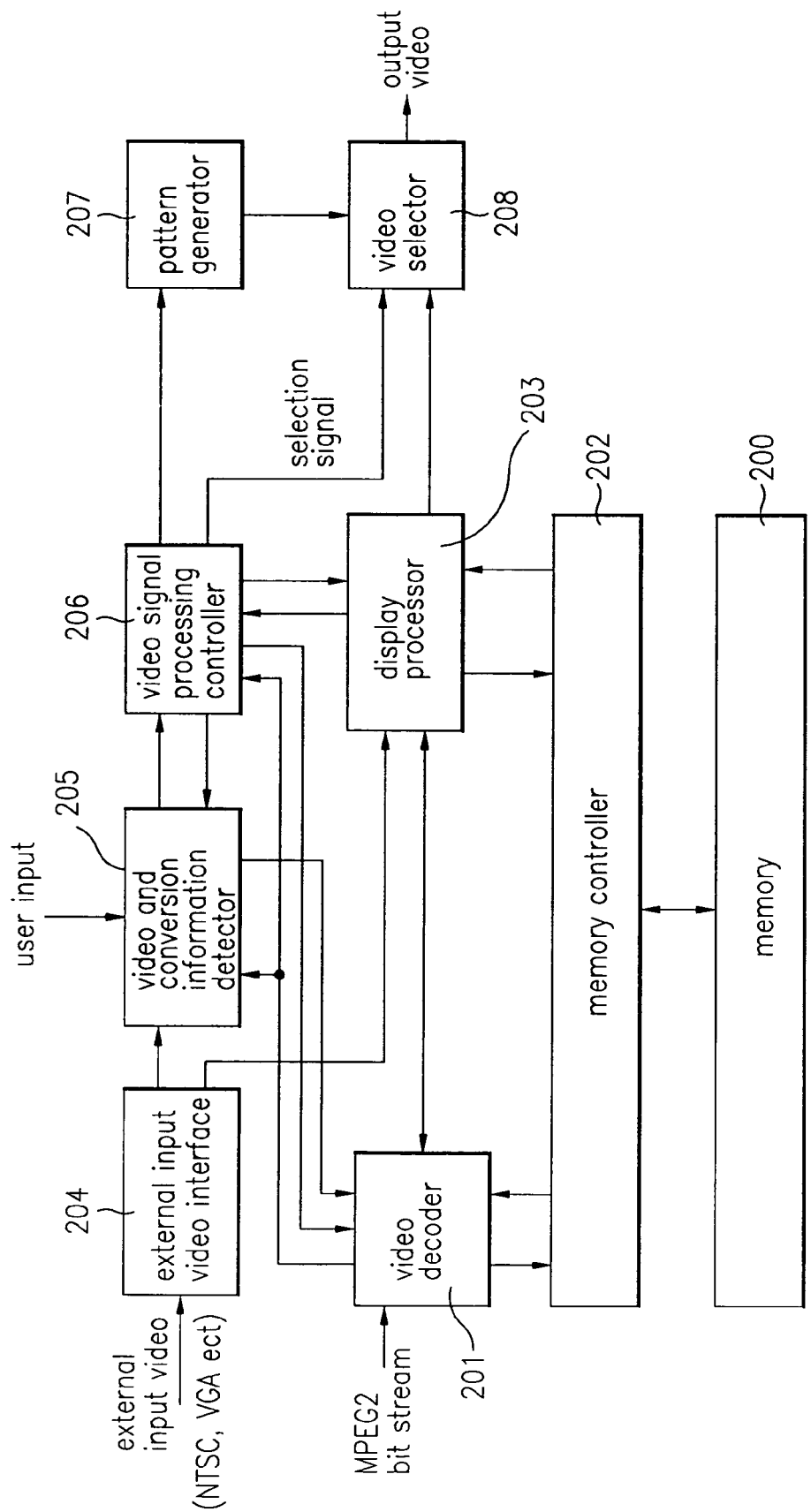
FIG. 4 is a block diagram of a video converting device of a digital TV according to the present invention.

FIG. 4 is a block diagram of a video converting device for a digital TV according to the present invention. In an exemplary embodiment, the digital TV employs an external memory 200 which includes a buffer for temporarily storing a bit stream and a frame memory. However, any other memory including an internal memory may be implemented rather than the external memory 200.

Referring to FIG. 4, the video converting device according to an exemplary embodiment of the present invention includes a video decoder 201 which reads and decodes a bit stream stored in the external memory 200, and stores the decoded bit stream back in the external memory 200; a display processor 203 which reads data from the memory 200 in accordance with conversion commands in order to process the corresponding conversions, thereby storing the converted data back to the memory 200; a memory controller 202 which controls data input/output to and from the memory 200, the video decoder 201 and the display processor 203; an external input video interface 204 which receives an external video and interfaces the input external video; a V&C information detector 205 which detects a conversion information from the outputs of the external input video interface 204 and the video decoder 201; and a video signal processing controller 206 which outputs a control signal to display a previous picture during a conversion if a conversion information is detected. The control signal obtained by, for example, by video signal processing controller 206, and outputted to, for example, display processor 203, may be applied to the converted video signal output solely in the event of unlike video format conversions being detected in succession.

Alternatively, the video signal processing controller 206 may also output a control signal to display a predetermined pattern during a conversion if a conversion information is detected. In such case, the video converting device further includes a pattern generator 207 which generates the predetermined pattern in accordance with the control signal of the video signal processing controller 206; and a video selector 208 which selects and outputs either an output of the display processor 203 or the pattern generator 207 in accordance with the control signal of the video signal processing controller 206 as a final video signal. Here, the display processor 203 outputs a previous picture decoded and stored in the memory 200.

Generally, assuming a conversion information detected by the V&C information detector 205 is a format conversion, the display processor 203 reads the video signal from the memory 200 by the control of the video signal processing controller 206, processes the format conversion, and stores the converted video signal back in the memory 200. At the same time, the display processor 203 outputs the converted video signal to the video selector 208 for display. The format conversion includes, but is not limited to, conversion of resolution, frame rate, scanning type, screen ratio, color coordinate, color difference format, and gamma correction.

The video selector 208 then selects the video signal converted to conform with the standard of the display format by the control of the video signal processing controller 206 and displays the selected result on the screen.

In the present invention, an input video may have various standards such as a compressed digital bit stream of a digital broadcasting signal, an analog or NTSC TV signal, or a VGA or computer video signal. The compressed digital bit stream is stored in the memory 200 through the video decoder 201 while the analog and computer video signals are input through the external input video interface 204. However, the display formats of the video signals may also have various standards corresponding to formats of a monitor for a decoded digital bit stream, an analog TV signal, or a computer video signal. As the input and output signal formats vary, a format conversion may be required.

Moreover, a video format for a same channel or program may also vary, which is referred as an 'input conversion' in the present invention. An example of an input conversion is when a drama on a channel is transmitted by a HD video while advertisements displayed before and after the drama are transmitted by a SD video.

Besides a format conversion and an input conversion, a conversion information may be a channel or mode conversion generated by a user command through an input device. Examples of the input device are a key panel attached to the digital TV, a wire or wireless remote control, a key board, a mouse or a wire or wireless pen mouse, or a touch screen.

Particularly, the format conversion or input conversion as described above is detected from the video signal output by the video decoder 201 or from a format information designated by the user through an input device. Since a format or an input conversion information is contained in various header information obtained by the video decoding, the V&C information detector 205 detects a format or input conversion information from the header information.

On the other hand, a channel or a mode conversion is detected by the V&C information detector 205 when a channel or mode conversion command is input by the user through the input device. For example, if a button for turning on/off the PIP or for changing the main screen and the subscreen is input by the user, the mode conversion information is input to the V&C information detector 205. Channel conversion occurs due to a variation in the input video format cause by a specific user input, such as, for example, by changing a tuned channel, which may or may not directly affect an instance of input conversion. Moreover, input conversion occurs due to a variation in the input video format during a program on a given channel, which is usually unknown to the user but which is announced to the system, for example, typically by including specific header information in the video bit stream. Furthermore, mode conversion occurs due to a variation in the output video format caused by a specific user input, such as, for example, by changing the display mode.

Therefore, if a channel conversion information, a mode conversion information, a format conversion information, or an input conversion information is detected, the V&C information detector 205 informs the video signal processing controller 206 of the detected result. At this time, if a conversion is detected by the V&C information detector 205, the video signal processing controller 206 outputs a control signal to the display processor 203 such that a predetermined video is repeatedly displayed during the conversion, rather than changing to a new frame.

If a conversion is detected by the V&C information detector 205 in a video converting device with a pattern generator and a video selector, the video signal processing controller 206 would output a control signal to the display processor 203, the pattern generator 207 and the video selector 208, such that the video selector display 208 repeatedly displays a predetermined video or displays a predetermined pattern during the conversion, rather than changing to a new frame.

In the above operation, the predetermined video may be a video decoded and last displayed through a reordering. Also, the predetermined pattern may be a background color such as a gray color.

In another embodiment of the present invention, the V&C information detector 205 detects an existence of a video signal as well as a conversion information from the outputs of the external input video interface 204 and the video decoder 201. If there is no video signal, the video signal processing controller 206 outputs a control signal to the pattern generator 207 and the video selector 208, such that a predetermined pattern or color is displayed.

Therefore, if a channel conversion information, a mode conversion information, a format conversion information, an input conversion information, or an existence of a video signal is detected, the V&C information detector 205 informs the video signal processing controller 206 of the detected result. In response, the video signal processing controller 206 outputs a control signal to display a previous picture or a predetermined color or pattern during a conversion if a conversion information is detected, and outputs a control signal to display a predetermined pattern or color if there is no video signal.

Thus, the video selector 208 selects either the output of the pattern generator 206 or the display processor 203 according to the control of the video signal processing controller 206, if there is a video signal and if a conversion is detected. Namely, the selection is made in accordance with a display 'on'/'off' signal, thereby displaying the selected result on a screen. For example, if a display 'on' signal is generated by the video signal processing controller 206, the data stored in the memory 200 is output through the display processor 203 and the video selector 208. On the other hand, if the display 'off' signal is generated, the predetermined pattern or color generated by the pattern generator 206 is output through the video selector 208.

Figure 5:
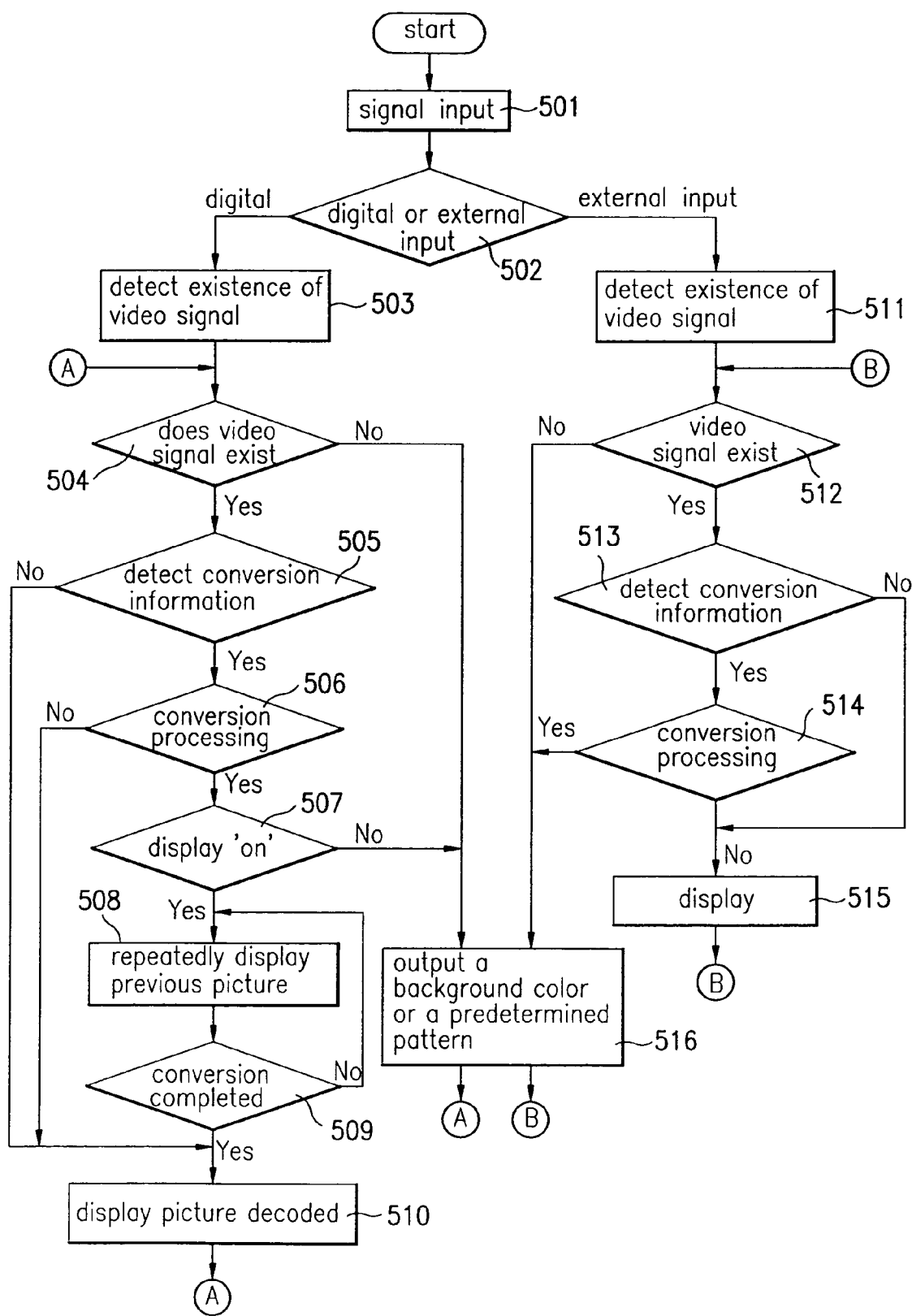
FIG. 5 is a flowchart of a converting method according to the present invention.

FIG. 5 shows a flowchart of a video converting method according to an exemplary embodiment of the present invention. An operation of the present invention when an analog signal is input will first be explained with reference to FIGS. 4 and 5.

If a predetermined signal is input (step 501), the V&C information detector 205 detects whether the input signal is a digital signal received through the video decoder 201 or an analog signal received through the external input video interface 204 (step 502). If it is determined that the input signal is an analog signal, the V&C information detector 205 checks whether the video signal exists from an input synchronizing signal (step 511).

If no video signal exists, the V&C information detector 205 informs the video signal processing controller 206 of the non-existence of the video signal and the video signal processing controller 206 controls the pattern generator 207 to display a predetermined pattern on the screen. Namely, the pattern generator 207 generates the predetermined pattern under the control of the video signal processing controller 206 and outputs the generated pattern to the video selector 208. The video selector 208 then selects the predetermined pattern and displays the pattern on the screen (step 516).

On the other hand, if the video signal is contained in the input signal, the V&C information detector 205 detects for a conversion information such as a channel, a mode, a format, and an input conversion information from the input synchronizing signal or from the user's input. The detected result is output to the video signal processing controller 206 (step 513). For example, since the format information is not separately transmitted, the V&C information detector 205 can detect the format information from the input synchronizing signal or from the input video format designated by the user.

If a conversion information is not detected, the input signal is displayed (step 515). However, if a conversion information is detected, the video signal processing controller 206 checks whether the conversion is currently being processed (step 514). If the conversion is being processed, the video signal processing controller 206 controls the pattern generator 207 for a predetermined time during which the conversion is completed to display a predetermined pattern or color through the video selector 208 (step 516). Once the conversion has been completed, the video signal processing controller 206 controls the display controller 203 to display the converted video through the video selector 208 on the screen (step 515).

The predetermined time during which the predetermined pattern or color is displayed on the screen is detected from the input synchronizing signal for an external signal.

For example, when a channel is being viewed by the user while a second channel is selected through an input device, the V&C information detector 205 detects the user input and outputs the detected input to the video signal processing controller 206. Thus, the video signal processing controller 206 controls the pattern generator 207 and the video selector 208 during the conversion to the second channel, thereby displaying the predetermined pattern or color. Upon completion of the conversion, the video signal processing controller 206 controls the display controller 203 and the video selector 208 to display the video signal of the second channel on the screen.

In another example, assume that a computer video signal having a color coordinate of RGB type and color difference format of 4:4:4 is input through the external input video interface 204, and is to be displayed by a digital TV. The V&C information detector 205 detects and outputs a conversion information to the video signal processing controller 206. Accordingly, the display processor 203 performs a conversion of the input signal with respect to the resolution, frame rate, scanning type, screen ratio, color coordinate to YCbCr type, and color difference format to 4:2:0, under the control of the video signal processing controller 206. During the processing of the format conversion, a predetermined pattern or color is displayed on the screen, and after the format conversion is completed, the converted video signal is displayed on the screen.

Referring back to FIG. 5, if the input signal is a digital signal, the V&C information detector 205 detects whether a video signal is contained in the output of the video decoder 201 (step 504). If it is determined that no video signal exists, the V&C information detector 205 informs the video signal processing controller 206 of the non-existence and the video signal processing controller 206 controls the pattern generator 207 to display a predetermined pattern or color on the screen (step 516). Here, the existence or non-existence of the video signal is detected from the decoded signal output by the video decoder 201.

If a video signal is contained in the input signal, the V&C information detector 205 detects for a conversion information such as a channel, mode, format and input conversion information from the output of the video decoder 201 or from a user's input. The detected result is then output to the video signal processing controller 206 (step 505). Namely, an input conversion and a format conversion is detected from the output of the video decoder 201, and a mode conversion and a channel conversion is detected from the user's input.

If a conversion information is not detected, the input signal is decoded and displayed (step 510). However, if a conversion information is detected, a determination is made whether the conversion is being processed (step 506). If a conversion is being processed, a status of the display 'on'/'off' is checked (step 507). In the display 'off' state, the pattern generator 207 displays a predetermined pattern or color on the screen (step 516) until the conversion is completed (step 509). In a display 'on' state, a previous picture is repeatedly displayed during a predetermined time (step 508) until the conversion is completed (step 509).

Once the decoding of the picture is completed, the conversion ends. When the conversion is complete, the newly decoded picture is read from the memory 200 and is displayed on the screen through the display processor 203 and the video selector 208 (step 510).

In the video converting method described above, the step of detecting for a video signal in the input signal (steps 503 and 511) may be omitted. In such case, after determining whether the input signal is a digital or an external signal (step 502), a detection of a conversion information would be executed (step 505 or 513).

Moreover, in the present invention, when an encoded bit stream is transmitted, the encoded bit stream is stored in the memory 200 via the video decoder 201 and the memory controller 202. The video decoder 201 then reads and decodes the bit stream from the memory 200 and stores the decoded bit stream back in the memory 200. Concurrently, the video decoder 201 outputs the picture type (I, P, B), various header information and format conversion information of the decoded bit stream to the V&C information detector 205. Particularly, the video decoder 201 then implements a VLD process to only the pure data information of the video stream and restores the pixel value of the original screen through an inverse quantization, an inverse discrete cosine transformation, and a movement compensation using movement vector. The restored data is thereby stored back in the memory 200.

During the above process, all data of the memory 200 and the video decoder 201 are input/output under the control of the memory controller 202. In one exemplary embodiment, the memory 200 is divided into a writing and reading of the bit stream for the VLD process, reading of data for the movement compensation, the writing of data decoded and the reading of data to be displayed. At this time, the order for decoding the picture (I, P, B, B, ...) and the order for displaying the picture (I, B, B, P, ...) are different, which necessitates the memory 200.

Generally, the I, P, and B pictures are picture types prescribed by the MPEG-2. In a I (Intra-coded) picture, the picture is DCT-processed and coded, without any movement compensation. In a P (Predicted-coded) picture, a movement compensation is executed based upon the I picture or a P picture and the remaining difference is DCT-processed. In the B (Bidirectionally predicted-coded) picture, a movement compensation is executed using two frames in the front or back portions with respect to the time axis.

Accordingly, the picture sequence of the MPEG-2 is formed in the order of { ..., B, B, I, B, B, P, B, B, I, B, B, P, B, B, I, B, ... }. In the picture sequence, a range from the first of two B pictures before an I picture to the next P picture is called a 'GOP,' based on the order of display. On the other hand, based on the order of transmission, a GOP ranges from a I picture to a picture before the next I picture. Moreover, the number of pictures within the GOP and the number of pictures between I and P pictures or between two P pictures may vary in one sequence.

Therefore, if a conversion information is detected, the V&C information detector 205 outputs the detected conversion information and a conversion processing command to the video signal processing controller 206. In response, the video signal processing controller 206 obtains the requisite information such as the picture header and various other header information from the video decoder, and outputs the information from the V&C information detector 205 and various control signals to the video decoder 201, and the display processor 203. Here, the video signal processing controller 206 would also output the requisite information and various control signals to the pattern generator 206 and the video selector 208 in a video converting device including a pattern generator and a video selector.

For example, a control signal output to the video decoder 201 may contain a command which indicates the position of the memory 200 storing a picture to be next decoded. Also, a control signal including a display 'on'/'off' signal may be output to the video selector 208. During a display 'on' state, the control signal output to the display processor 206 may also contain a command which indicates the position of the memory 200 storing a picture to be displayed. On the other hand, during a display 'off' state, the control signal output to the display processor 206 may contain a command indicating which pattern or color is to be generated and output by the pattern generator 206.

Thus, the video signal processing controller 206 may output the display 'on'/'off' signal, the signal designating the position within the memory 200 to be used for decoding, and the signal designating the position within the memory 200 to be used for display, based upon the conversion information detected by the V&C information detector 205. Thereafter, the video decoder 201 reads the data on the designated position for decoding from the memory 200 and decodes the read data. Similarly, the display processor 203 reads the data on the designated position for display from the memory 200 and outputs the read data to the video selector 208.

Figure 6:
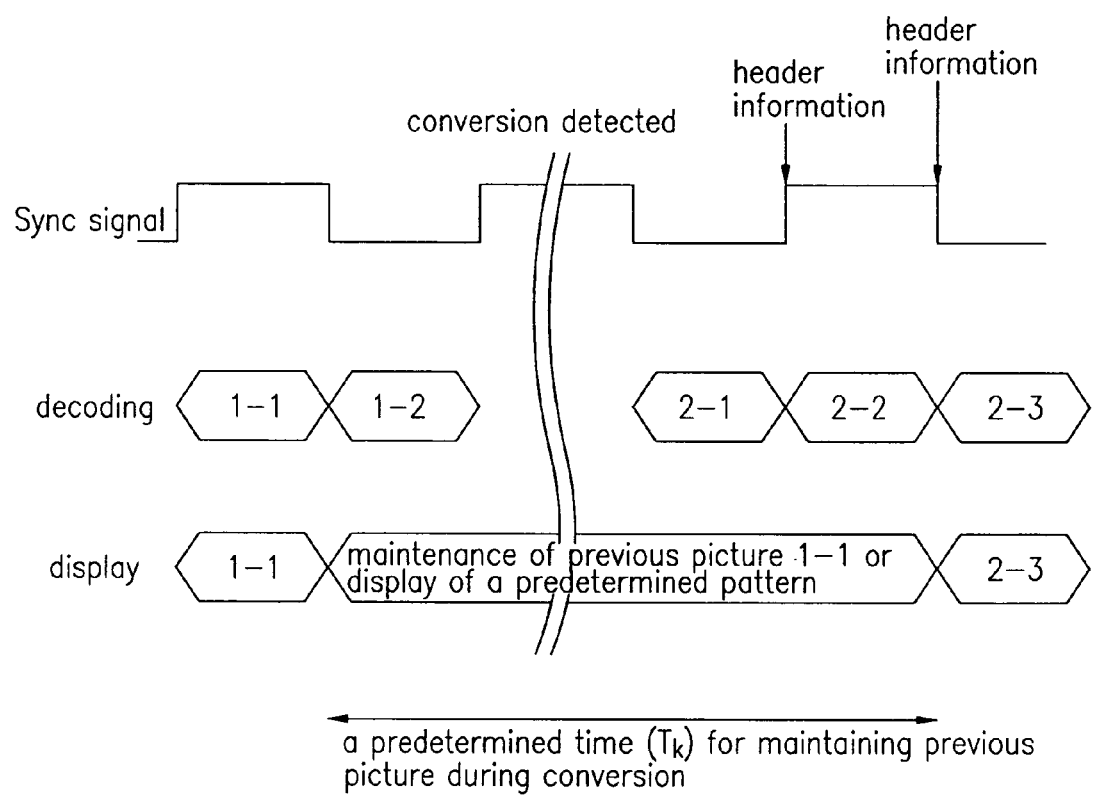
FIG. 6 is a timing diagram illustrating the operations upon format, channel, input and mode conversion according to the present invention.

For example, assume that a conversion information is detected while the video decoder 201 is decoding the picture '1-2' as shown in FIG. 6, and that the picture '2-3' is the first picture which can be decoded and displayed, without breakage after a conversion. Under the control of the video processing controller 206, the video decoder 201 would stop decoding the picture '1-2,' read from the memory 200 the new picture '2-1' necessary for the conversion, and begin decoding the picture '2-1.' Namely, if the conversion information is a channel conversion from a first to second channel, the pictures '1-1' and '1-2' would be pictures for the first channel and the pictures '2-1', '2-2' and '2-3' would be the pictures for the second channel.

At this time, the display processor 203 reads from the memory 200 the previous picture, i.e. the picture '1-1' of the first channel, under the control of the video signal processing controller 206 and may maintain a display of the read picture for a predetermined time. As shown in FIG. 6, the previous picture would be the video which was last decoded and displayed before the detection of a conversion information. Also, the reference symbol '$T_k$' represents the predetermined time necessary for maintaining the decoded picture during a conversion and is stored in the memory 200. Accordingly, the previous picture, i.e. the picture '1-1,' is repeatedly displayed until the picture '2-3' is decoded. However, in a display 'off' state, a predetermined pattern or color generated from the pattern generator 206 is displayed during the predetermined time $T_k$.

In the example shown in FIG. 6, if the decoding of the picture '2-3' is completed, the conversion ends. Therefore, when the conversion is complete, the picture '2-3' is read from the memory 200 and is displayed on the screen through the video selector 208.

Therefore, in the present invention, during a conversion, a previous picture which has already been decoded and stored in the memory 200 is displayed during the predetermined time on the screen. As a result, a screen breakage due to a change of the memory map during the various conversion processes is prevented.

Once the conversion is completed, the order of display may begin from an I picture among the decoded pictures. However, minimizing the conversion time is also important for an efficient conversion of a format, input, channel or mode. Therefore, in the present invention, the converting time $T_k$ can significantly be reduced when the video bit stream has a GOP structure and when a 'closed_GOP' flag is equivalent to '1.'

Figure 7:
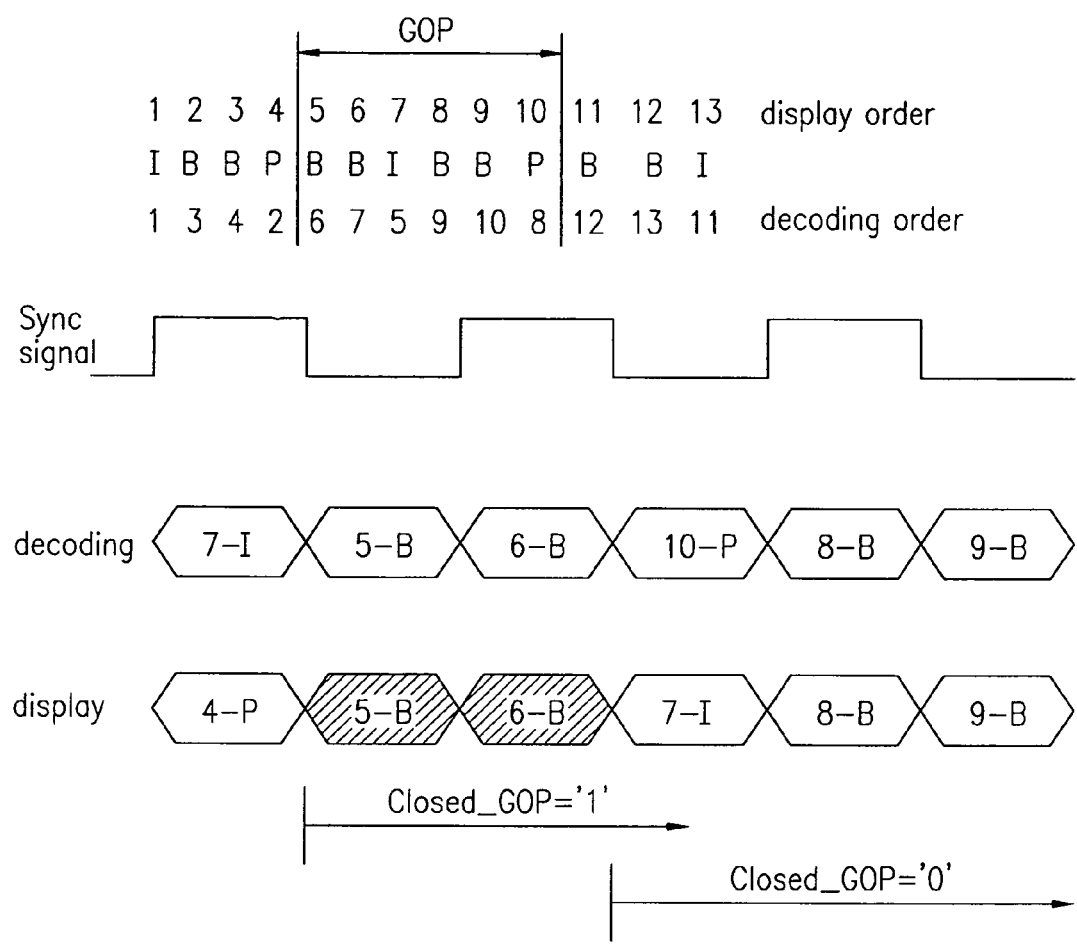
FIG. 7 is a timing diagram illustrating the operations according to the present invention, based upon a closed GOP flag.

Generally, the 'closed_GOP' flag is included in the header information of the transmitted bit stream. The flag has a value of '1' when a B picture is coded using only a picture I while a value of '0' indicates that the B picture is coded using both a I picture and a P picture. Accordingly, based upon the order of display shown in FIG. 7, the order for decoding the pictures in the bit stream is 7-I, 5-B, 6-B, and 10-P.

Assuming that the pictures 1-I, 2-B, 3-B and 4-P are pictures before a conversion, only the picture 7-I is needed to decode the pictures 5-B and 6-B, if the 'closed_GOP' flag is '1.' In such case, the order of display may begin with the picture 7-I. However, even if the picture 5-B were to be displayed first, a screen breakage would not occur. On the other hand, if the 'closed_GOP' flag is '0', both the pictures 7-I and 4-P are needed to decode the pictures 5-B and 6-B. Therefore, the display must begin with the picture 7-I to prevent a screen breakage.

Accordingly, in the present invention, the order of display begins from 5-B rather than from 7-I if the 'closed_GOP' flag is '1,' thereby reducing the time $T_k$. In other words, the display processor 203 displays the pictures of the bit stream in the order of {'5-B', '6-B', '7-I', ... } if the 'closed_GOP' flag is '1' and displays the pictures in the order of {'7-I', '8-B', '9-B', ... } if the 'closed_GOP' flag is '0.' Accordingly, the conversion time $T_k$ can be reduced such that the picture may be decoded and displayed more quickly without causing breakage, even when the decoding begins after the conversion and when there is a continuously display.

In the present invention, the V&C information detector and the video signal processing controller may be implemented by a software or by a hardware.

In sum, a video converting device and method of a digital TV according to the present invention can maintain a previous picture, during conversion such as a mode, a channel, an input and or format conversion, until the conversion to a new frame is completed, thereby preventing a screen breakage generated due to the change of a memory map caused by a conversion processes. As a result, a pleasant screen is displayed to a user.

Additionally, a video converting device and method of a digital TV according to the present invention can display a predetermined pattern or a predetermined background color on a screen, if there is no video signal, thereby displaying a pleasant screen to a user.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video converting device of a digital TV comprising:
   a memory which stores an encoded bit stream, said memory being mapped according to a first video format conversion for processing the stored bit stream;
   a video decoder which reads and decodes the encoded bit stream from the memory, and stores a decoded bit stream back in the memory;
   a (V&C) video and conversion information detector which detects decoded mode conversion information, input conversion information, channel conversion information and format conversion information from the video decoder, said detected information being indicative of a need for remapping said memory based on a second video format conversion for processing the stored bit stream;
   a display processor which processes an input conversion or a format conversion or a mode conversion corresponding to the decoded conversion information detected by the (V&C) video and conversion information detector and maintains a predetermined video for a predetermined time period during which the remapping of said memory occurs, if conversion information is detected by the (V&C) video and conversion information detector;
   a pattern generator which generates a predetermined pattern;
   a video signal processing controller which outputs control signals to select the predetermined pattern generated by the pattern generator, if the decoded conversion information is detected and a display off is detected or if an existence of a video signal is not detected; and
   a video selector which selects the predetermined pattern generated by the pattern generator according to the control signal output from the video signal processing controller and displays the selected predetermined pattern for a predetermined time period during which the remapping of said memory occurs or until an existence of a video signal is detected.

2. A device of claim 1, wherein the memory is an external memory.

3. A device of claim 1, wherein the V&C information detector detects the conversion information from either a decoded video bit stream output from the video decoder or from a user input received through an input device.

4. A device of claim 3, wherein the input device is one of a key panel attached on the digital TV, a wire or wireless remote control, a key board, a mouse, a pen mouse, or a touch screen.

5. A device of claim 1, wherein said video signal processing controller outputs to the video decoder a first control signal designating a position within the memory which stores a picture for decoding and outputs to the display processor a second control signal designating a position within the memory which stores a picture for display, if conversion information is detected by the V&C information detector.

6. A device of claim 1, wherein the video signal processing controller controls the display processor to repeatedly display a previous video during the predetermined time.

7. A device of claim 6, wherein said predetermined time is a period required for a picture to be decoded, without any breakage, even if the picture is decoded and continuously displayed after the memory remapping.

8. A device of claim 6, wherein said display processor first displays an I picture, if the decoded bit stream has a GOP structure and if a 'closed_GOP' flag is '0'.

9. A device of claim 6, wherein said display processor first displays a B picture, if the decoded bit stream has a GOP structure and if a 'closed_GOP' flag is '1'.

10. A device of claim 1, further comprising an external input video interface which receives an analog video having various formats, and outputs the received analog video to the V&C information detector and the display processor.

11. A device of claim 10, wherein the V&C information detector detects the conversion information from an input synchronizing signal of the analog video output by the external input video interface and outputs the detected result to the video signal processing controller.

12. A device of claim 11, wherein the video signal processor controller controls the display processor to repeatedly display a previous video for the predetermined time if conversion information is detected by the V&C information detector.

13. A device of claim 10, wherein the V&C information detector detects an existence of a video signal from an input synchronizing signal of the analog video output by the external input video interface, and wherein the video signal processor controller controls the pattern generator to output and display the predetermined pattern for the predetermined time if an existence of a video signal is not detected by the V&C information detector.

14. A device of claim 1, wherein the V&C information detector further detects an existence of a video signal from the decoded bit stream, and wherein the video signal processing controller controls the video selector to display the predetermined pattern, if an existence of a video signal is not detected by the V&C information detector.

15. A device of claim 14, wherein said V&C information detector detects the existence of a video signal from header information of the bit stream decoded and output from the video decoder.

16. A video converting method of a digital TV comprising:
   (a) storing an encoded bit stream in a memory, said memory being mapped according to a first video format conversion for processing the stored bit stream;
   (b) decoding the encoded bit stream from the memory, and storing a decoded bit stream back in the memory;
   (c) detecting mode conversion information, input conversion information, channel conversion information and format conversion information from the decoded bit stream, said detected information being indicative of a need for remapping said memory based on a second video format conversion for processing the stored bit stream;
   (d) processing a conversion corresponding to conversion information and maintaining a predetermined video for a predetermined time period during which the remapping of said memory occurs, if conversion information is detected in (c);
   (e) generating a predetermined pattern;
   (f) outputting a control signal to select the predetermined pattern generated in (e), if the decoded conversion information is detected and a display off is detected or if an existence of a video signal is not detected; and
   (g) selecting the predetermined pattern generated in (d) according to the control signal output in (f) and displaying the selected predetermined pattern for a predetermined time period during which the remapping of said memory occurs.

17. A method of claim 16, further comprising displaying a previous video during the predetermined time, if conversion information is detected in (c).

18. A method of claim 16, wherein (c) further detects conversion information from an analog video.

19. A method of claim 18, wherein (c) further detects an existence of a video signal from an input synchronizing signal of the analog video.

20. A method of claim 19, wherein the predetermined pattern is displayed for the predetermined time if an existence of a video signal is not detected in (c).

* * * * *